United States Patent [19]

Coren

[11] 4,367,971

[45] Jan. 11, 1983

[54] SOCKET RETAINERS

[76] Inventor: Alfred S. Coren, 113 Hunnewell St., Needham, Mass. 02192

[21] Appl. No.: 273,757

[22] Filed: Jun. 15, 1981

[51] Int. Cl.$^{3}$ .......................... B25G 3/00; F16B 7/18; F16D 1/00; F16L 15/00

[52] U.S. Cl. .................................... 403/330; 403/327; 403/104; 403/109; 292/128

[58] Field of Search ............... 403/330, 327, 326, 316, 403/317, 325, 361, 104, 109; 292/128

[56] References Cited

U.S. PATENT DOCUMENTS 2,067,329 1/1937 McGuffin ....................... 403/327 X
2,379,472 7/1945 Bowman ............................ 403/327
3,161,923 12/1964 Crain .................................. 292/128
4,146,341 3/1979 Smith ............................. 403/330 X

*Primary Examiner*—Wayne L. Shedd
*Attorney, Agent, or Firm*—Maurice R. Boiteau

[57] ABSTRACT

There is disclosed in the present application, a retainer for sockets especially useful in connection with socket wrenches and accessories. The retainer, which is added to a male member includes a spring-pressed lever which is depressed as the mating female member or socket is introduced over the lever and then locks into the interior of the socket with a self-energizing form of engagement to resist withdrawal until the spring pressure is overcome to release the lock.

7 Claims, 4 Drawing Figures

SOCKET RETAINERS

The present invention relates generally to improvements in joints including retainers or locks for sockets and other female accessories to be retained on the ends of male members, particularly in socket wrenches and the like. The invention relates, in a broader sense, to a lock which is usable with unmodified female parts and provides a self-energizing resistance to separation of the mating parts.

Although, joints according to the present invention may include portions of various male accessories and the female members may include either the female ends of nut-engaging sockets or those of accessories such as extensions, in the interest of simplicity and clarity, male and female members of joints will hereinafter be referred to as studs and sockets respectively.

Conventional quick-release retaining joints for socket wrenches have not been entirely satisfactory for two main reasons, either requiring modified sockets or providing insufficient retention when used with worn sockets. The type of joint including a spherical detent and a socket modified by undercutting to receive the detent is burdensome to use in a typical shop where the sockets are diverse, of various vintages and from different manufacturers. On the other hand, conventional quick-release spherical detents used with unmodified sockets are also objectionable in case of socket wear or of heavy accessories. In such cases, the socket often tends to separate from the stud, thereby causing appreciable delays and frustrations in performing the task at hand.

It is accordingly an object of the present invention to provide a simple and secure joint useful for socket type wrenches but which may also be useful in various analogous environments.

Another object is a joint which is usable with unmodified sockets even after the sockets have become worn.

Still another object is a joint adapted to resist forces tending to cause separation of the socket from the stud, such as a heavy accessory depending from the socket.

In the achievement of the foregoing objects, a feature of the invention relates to a locking lever retained in a slot in the stud and urged toward a position of locking engagement with the socket. The lever, according to a related feature is formed and positioned in such a way that, once it engages the interior of a socket, any tendency of the socket to separate from the stud is resisted by tighter engagement. For this purpose, the lever is formed to pivot at its forwared end at an abutment and to tilt outwardly about the pivot into tight engagement with the body of the mating socket.

The foregoing objects and features will be more fully understood and appreciated from the following detailed description of an illustrative embodiiment, presented by way of example, in connection with the accompanying drawings in which:

FIG. 4 is a view partly in longitudinal section depicting an alternative embodiment of the invention, particularly useful for ratchet drives and the like.

Figure 1:
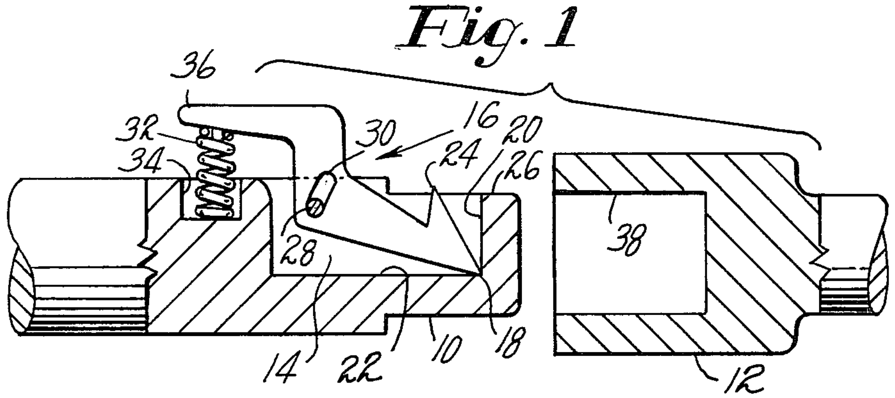
FIG. 1 is a view, partly in longitudinal section of a stud including a locking device according to the present invention and a mating socket, the parts being shown prior to engagement.
Figure 2:
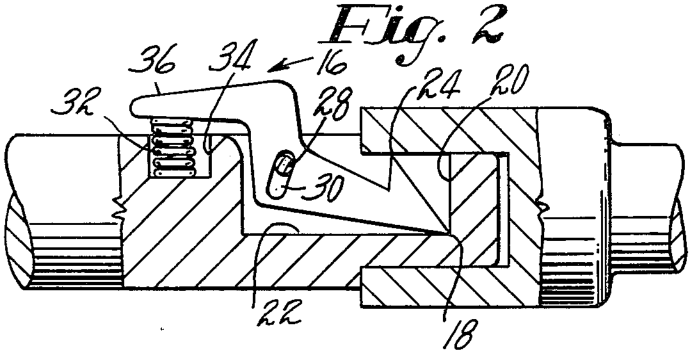
FIG. 2 is a view similar to FIG. 1 but with the stud shown engaging the socket.
Figure 3:
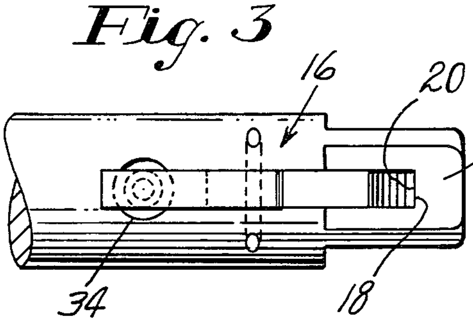
FIG. 3 is a plan view of the stud depicted in FIGS. 1 and 2, showing added details of the locking device.

Turning now to the drawings, particularly FIGS. 1 to 3, there is shown a joint for wrenches including a stud or male member 10, typically of square cross-section and a complementary socket or female member 12. Although the joint is shown being applied to wrenches, it will be appreciated that the invention is susceptible to modifications for other purposes, the scope of which is to be interpreted only in terms of the appended claims. The stud 10 is formed with a recess 14 into which is fitted a locking lever indicated generally at 16 and including a pointed tip 18 which pivots on an abutment in the forward corner of the recess 14 defined by the forward wall 20 and the bottom wall 22. From the tip 18, the lever 14 is formed with a forward surface which recedes outwardly and away from the forward wall 20 to a point or pawl 24, extending beyond a flat surface 26 of the stud 10.

The lever 16 is retained in the recess 14 by a pin 28 pressed into the body of the stud 14 and passing loosely through an arcuate slot 30 generally concentric with the tip 18. In the position of the lever as shown in FIG. 1, travel of the lever is limited by the engagement of the bottom of the slot 30 with the pin 28. In this condition, the lever 16 is urged in a clockwise direction, as seen in FIG. 1, by a spring 32 compressed between a cavity 34 in the stud 10 and an operating arm 36 of the lever. While the lever 16 is thus urged to the limit of its clockwise movement, the pawl 24 projects above the surface 26 ready to engage the interior wall 38 of the socket 12.

As the socket 12 is slipped over the stud 10, the surface 38 rides over the pawl, depressing it as it advances but the fit between the stud cross-section and the pawl on the one hand and the interior walls of the socket is such that the upper end of the slot 30 never reaches the pin 28. The force of the spring 32 is exerted in urging the pawl 24 into tight engagement with the wall 38. Further, if an outwardly directed force is applied to the socket tending to separate it from the stud without depressing the operating arm 36, the pawl 24 is pivoted outwardly about the pivot point 18, causing tighter engagement of the pawl to resist withdrawal of the socket.

Figure 4:
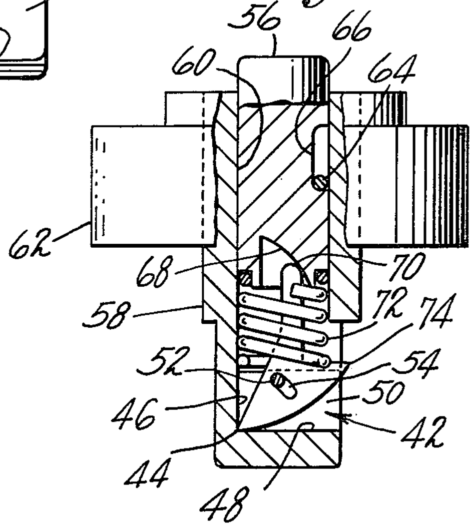

Turning now to the alternative construction depicted in FIG. 4, it is adapted to conditions in which the length of the stud is sufficiently limited that release of the pawl may be accomplished by an axially slidable member. Such conditions are encountered particularly in ratchets and T-handles. In this embodiment, there is included a locking lever indicated generally at 42, pivoted at its lower pointed end 44 in a corner defined by vertical and horizontal walls 46 and 48 respectively, which together with side walls 50 define an open slot in which the lever is contained, being retained in the slot by a pin 52 passing loosely through an arcuate slot 54 in the lever. The lever 42 operates in the same general manner as the lever 16, except that release of the socket is accomplished by means of a plunger 56 slidable in a guideway 60 in the stud, adapted to receive a reversible unidirectional motion from a ratchet body 62. The plunger 56 is retained in the guideway 60 by a pin 64 which is engaged by the ends of a slot 66 to limit the motion of the plunger. At its lower end, the plunger 56 is formed with a cam surface maintained in engagement with an operating arm 70 of the lever 42 by a spring 72 compressed between the plunger and the lever. The guideway 56 is cylindrical, communicating with the relatively narrow slot 46,48, 50 in which the lever 42 is retained, and thus confining the spring 72 to its position between the plunger 56 and the lever to urge the plunger upwardly and the lever in a clockwise direction so that a pawl 74, forming a part of the lever 42, extends outwardly beyond the outer surface of the stud and is thus ready to engage a mating socket. When the plunger 56 is depressed, the cam surface 68, by its engagement with the arm 70, causes the lever to move in a counter-clockwise direction to release the grip of the pawl 74 on the socket.

From the foregoing description of alternative embodiments of the invention, many modifications within the spirit of the present disclosure will suggest themselves to those of ordinary skill in the art. It is accordingly not intended that the scope of the invention be interpreted from the foregoing description and drawings, but rather that it be determined from the appended claims.

Having thus disclosed my invention, what I claim as new and desire to secure by Letters Patent of the United States is:

1. A joint for coupling two members comprising a female member formed with a polygonal cavity, a stud having a cross-section complementary to that of the cavity, means defining a longitudinal recess in the stud, a locking lever fitted to the recess, the lever having a forward end pivoted on an abutment in the recess and an intermediate pawl enggaging the cavity at a point rearwardly from the abutment and a resilient means urging the pawl into engagement with the cavity.

2. A joint according to claim 1 further characterized in that the recess is formed with a closed end defining the abutment upon which the lever is pivoted.

3. A joint according to claim 1 further comprising means for retaining the lever in the recess with freedom to pivot about its forward end.

4. A joint according to claim 3 further characterized in that the lever retaining means includes and arcuate slot in the lever and a fixed pin passing loosely through the slot.

5. A joint according to claim 1 further comprising an operating arm on the lever extending rearwardly away from the pawl.

6. A joint according to claim 5 further comprising a plunger formed with a cam surface engaging the operating arm of the lever.

7. A joint according to claim 6 further characterized in that the resilient means is a spring interposed between the plunger and the lever and urging the pawl outwardly into engagement with the cavity and the plunger rearwardly away from the point of engagement of the pawl with the cavity and maintaining the operating arm in engagement with the cam surface.

* * * * *